Patented Jan. 30, 1940

2,188,369

UNITED STATES PATENT OFFICE 2,188,369

ANTHRAQUINONE COMPOUND AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application December 8, 1936, Serial No. 114,864

17 Claims. (Cl. 260—371)

This invention relates to anthraquinone compounds and more particularly to anthraquinone compounds suitable for the coloration of materials made of or comprising organic derivatives of cellulose. The invention includes the anthraquinone compounds, the process for their preparation, the process of coloring with them, and materials colored with the compounds of the invention.

Organic derivatives of cellulose are characterized by an indifferent affinity for the usual cotton or wool dyes, especially the ordinary water-soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have discovered that nuclear non-sulphonated anthraquinone compounds having an alkylene sulphonic acid group, other than methylene, attached to the anthraquinone nucleus through a nitrogen atom may be employed for the dyeing or coloration of organic derivatives of cellulose. While the said anthraquinone compounds may be generally employed for the coloration of materials made of or containing organic derivatives of cellulose, our invention is more particularly directed to those anthraquinone compounds containing neither a sulphonic acid group nor a carboxylic acid group in the anthraquinone nucleus. The dyeings produced by the dye compounds of the invention are, in general, of good fastness to light and washing and range in shade from purple to blue green. The nuclear sulphonated compounds, as indicated above, in particular, have little or no utility for the coloration of organic derivatives of cellulose. They may, however, be employed for the dyeing or coloration of cotton, wool, rayon and natural silk.

The expression "a carboxylic acid group" as used herein and in the claims is intended to include not only the carboxylic acid group per se, but substituted carboxylic acid groups as well, including, for example, a carboxylic acid amide group.

While our invention relates broadly to anthraquinone compounds, not containing a sulphonic acid group or a carboxylic acid group on the anthraquinone nucleus, having an alkylene sulfonic acid group, other than methylene, attached to the anthraquinone nucleus through a nitrogen atom, it relates more particularly to those compounds corresponding to the general formula:

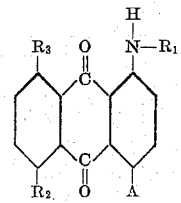

wherein $R_1$ represents an alkylene sulfonic acid group, other than methylene, A represents a hydroxy group, a halogen atom, a

group, wherein X and Y represent hydrogen, a hydroxy group, an alkyl group, an alkoxy group, an aralkyl group, an aryl radical, a heterocyclic radical, a hydroaromatic radical or an alkylene sulfonic acid group and $R_2$ and $R_3$ represent univalent non-metallic substituents, other than a sulfonic acid group or a carboxylic acid group, such as hydrogen, a hydroxy group, an alkoxy group, an amino group, an alkylamino group, a hydroxyalkylamino group, a heterocyclic amino radical and an arylamino group. It will be understood that X and Y may be the same or different substituents. Similarly $R_2$ may be the same substituent as $R_3$ or a different substituent.

The alkylene sulfonic acid group may be in its free acid form or in the form of a salt. Thus, it may be in the form of a salt of an organic base, such as ethanolamine, an alkali metal such as sodium or potassium, an alkaline earth metal such as calcium, a metal such as copper or of ammonium.

In order that our invention may be more particularly understood, a number of compounds included within the scope thereof are disclosed hereinafter. For purposes of simplicity, the invention will be illustrated in connection with the general formula above given, but it will be understood that the invention is not limited thereto.

Referring more specifically to the substituents which may go to form the compounds represented by the general formula, $R_1$ may be an alkylene sulfonic acid group, other than methylene, such as —$CH_2CH_2SO_3H$,

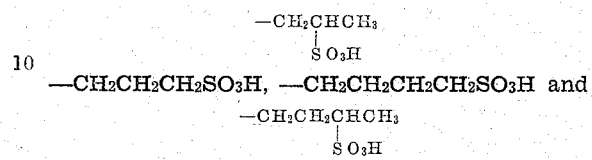

—$CH_2CH_2CH_2SO_3H$, —$CH_2CH_2CH_2CH_2SO_3H$ and

X and Y may be an alkylene sulfonic acid group, such as those given to illustrate $R_1$, an alkyl group, such as methyl, ethyl, propyl or butyl, an alkoxy group such as —$OCH_3$, —$OC_2H_5$, —$OC_3H_7$, a substituted alkyl group such as a hydroxyalkyl group, an aralkyl radical such as benzyl, an aryl radical such as phenyl or naphthyl, a heterocyclic radical such as quinolyl, or a hydroaromatic radical such as cyclohexyl. Said hydroxyalkyl group may be —$CH_2CH_2OH$, —$CH_2CH_2CH_2OH$ or

for example.

Similarly, $R_2$ and $R_3$ may be an alkoxy group such as —$OCH_3$, —$OC_2H_5$, —$OC_3H_7$, an alkylamino group such as $$-\overset{H}{N}CH_3, -\overset{H}{N}C_2H_5, -\overset{H}{N}C_3H_7$$

a hydroxyalkylamino group such as

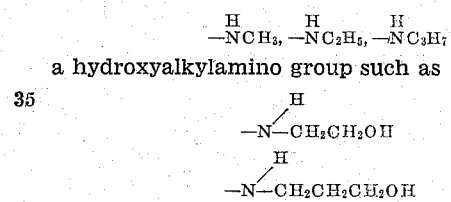

a heterocyclic radical such as quinolyl and an arylamino group such as

Anthraquinone derivatives of our invention can be prepared by treating compounds such as di-aminoanthrarufin, leuco quinizarin, leuco-1-amino-4-hydroxyanthraquinone, leuco-1, 4, 5, 8-tetrahydroxyanthraquinone with an alkylene sulfonic acid, other than methylene, preferably in the form of a salt, an alkali metal or ammonium salt, for example, alone or by treatment of the above-named compounds with mixtures of an appropriate alkylene sulfonic acid with methylamine, ethylamine, ethanolamine, aniline, 8-amino quinoline or 4-amino-di-hydroxyethyl-aniline, for example, and oxidizing the leuco compounds formed to obtain the desired products.

The preparation of anthraquinone derivatives containing more than one substituent can be carried out step-wise. Thus, 1-β-sulfoethyl-amino-4-methylamino anthraquinone, for example, can be prepared by reacting leuco quinizarin with one equivalent of sodium taurinate and then with methylamine. The above reactions may be carried out in pyridine or an alcohol such as propanol, butanol or isobutyl and the resulting leuco compounds oxidized with air in solution or with nitrobenzene. In some instances, it may be desirable to carry out the oxidation treatment simultaneously with the formation of the leuco derivative and this may be done by passing air through the mixture during the period of formation of the leuco derivative.

The preparation of the anthraquinone compounds of our invention will be clear from the following examples. Quantities are expressed in parts by weight.

EXAMPLE 1

*Preparation of 1-sodium-β-sulfoethylamino-4-hydroxyanthraquinone*

2.4 parts of leuco quinizarin, 24.5 parts of pyridine and a solution of 1.11 parts of taurine and 0.53 part of anhydrous sodium carbonate in 15 parts of hot water are boiled four hours. Air is passed into the hot solution which is allowed to evaporate somewhat. The violet solution resulting is then well cooled and the 1-sodium-β-sulfoethylamino-4-hydroxyanthraquinone recovered by filtration. The recovered compound may be purified by dissolving in hot water and filtering. The filtrate may be employed for dyeing or, if desired, it may be acidified and the dye compound recovered in the form of the free acid which may also be employed for direct dyeing from an aqueous dyebath.

EXAMPLE 2

*Preparation of 1-sodium-β-sulfoethylamino-4-sodium-β-sulfoethylamino anthraquinone*

2.4 parts of leuco quinizarin, 24.5 parts of pyridine and a solution of 3.52 parts of taurine and 1.5 parts of anhydrous sodium carbonate in 15 parts of hot water are refluxed for four hours and the resulting solution evaporated to dryness on a steam bath while passing in a brisk stream of air. The 1,4-di (sodium-β-sulfoethylamino) anthraquinone is obtained as a blue-black solid with a red metallic lustre. It dissolves readily in cold water. The free acid form may be easily obtained upon the addition of a slight excess of mineral acid to its solution in cold water.

EXAMPLE 3

*Preparation of 1-sodium-β-sulfoethylamino-4-β-hydroxyethylamino anthraquinone*

The leuco form of 1-sodium-β-sulfoethylamino-4-hydroxyanthraquinone is prepared exactly as in Example 1. Before passing in air, however, 0.63 part of ethanolamine are added and the solution refluxed an additional two hours, after which air is passed into the solution and the anthraquinone dye compound obtained by evaporation of the solvent. If desired, the dye can be purified by dissolving in water and filtering.

EXAMPLE 4

*Preparation of 1-sodium-β-sulfoethylamino-4-benzylaminoanthraquinone*

This compound is prepared exactly as the compound of Example 3, except that 1.1 parts of benzylamine are substituted for ethanolamine.

EXAMPLE 5

*Preparation of 1-sodium-β-sulfoethylamino-4-methylaminoanthraquinone*

The above-named compound is prepared exactly as the compound of Example 3, except that one part of 33% aqueous methylamine solution is substituted for ethanolamine.

EXAMPLE 6

*Preparation of 1-sodium-β-sulfoethylamino-4-butylaminoanthraquinone*

This compound is prepared following the directions of Example 3, except that a molecular equivalent amount of butyl amine is substituted for the ethanolamine of Example 3.

Example 7

25.8 parts of leuco-1,4,5-trihydroxyanthraquinone are dissolved in 491 parts of hot pyridine. 14.7 parts of sodium taurinate are then added and the reaction mixture refluxed for two hours. 10.8 parts of cyclohexylamine are added and refluxing is continued for an additional four hours. The leuco compound resulting is oxidized by passing air into the reaction mixture. The dye compound formed can be obtained by concentrating the reaction mixture and cooling and has the following probable structure:

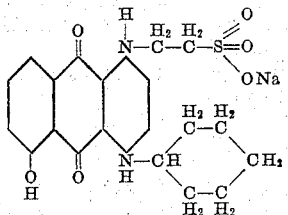

This compound colors organic derivatives of cellulose, natural silk and wool blue tints from an aqueous solution containing sodium chloride.

Example 8

14.7 parts of sodium taurinate are placed in 491 parts of pyridine containing 27.4 parts of leuco-1,4,5,8-tetrahydroxyanthraquinone and refluxed for two hours. 11.3 parts of p-phenylene diamine are then added and refluxing continued for an additional four hours. The resulting leuco compound is then converted to the desired blue anthraquinone derivative by oxidation with air. The anthraquinone compound formed has the following probable structure:

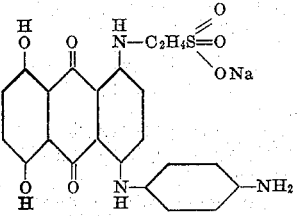

This compound can likewise be prepared by adding sodium taurinate and p-phenylene diamine initially to leuco-1,4,5,8-tetrahydroxyanthraquinone and refluxing in pyridine until reaction is complete.

The dye compound of this example colors organic derivatives of cellulose, natural silk and wool blue tints.

Example 9

4.3 parts of 5,8-dihydroxy-1-β-sulfoethylamino-4-(4'-amino-phenyl)-aminoanthraquinone are boiled for one hour on an oil bath with 20 parts of ethylene chlorohydrin and 5 parts of sodium acetate. The reaction mixture is poured into water and the blue anthraquinone compound precipitated by the addition of sodium chloride, after which it is filtered, washed and dried. The compounds obtained yields greenish-blue tints when employed for dyeing natural silk, wool and cellulose acetate, for example, and has the following probable structure:

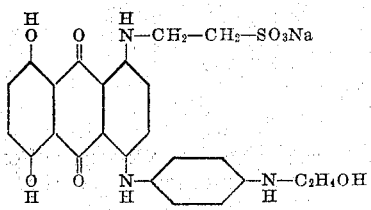

Similarly, anthraquinone derivatives suitable as dye compounds may be prepared by substituting a chlorohydrin of trimethylene, propylene or glycerol for ethylene chlorohydrin.

Example 10

24 parts of leuco quinizarin, 24.2 parts of cetylamine and 20 parts of $NH_2.CH_2.CH_2.CH_2.SO_3Na$ are heated in water for four hours and the resulting leuco compound oxidized with hydrogen peroxide. The reaction product has the probable formula:

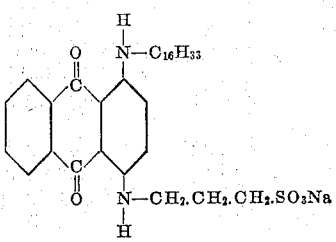

and dyes cellulose acetate blue shades from an aqueous dyebath which may contain sodium chloride.

Example 11

27.4 parts of leuco-1,4,5,8-tetrahydroxyanthraquinone are heated in water under pressure at 110–120° C. with alkaline sodium hydrosulfite, 20 parts of $NH_2.CH_2.CH_2.CH_2.SO_3Na$ and 15 parts of butyl amine for a period of 10 hours and the leuco compound resulting is oxidized with sodium perborate. The reaction product has the following probable formula:

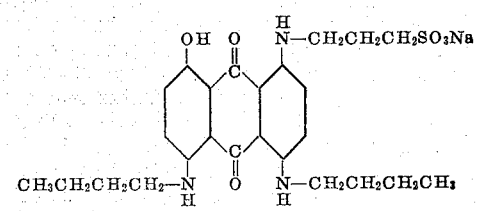

and dyes cellulose acetate a greenish-blue shade from an aqueous solution which may contain sodium chloride.

Both water-insoluble and water-soluble compounds are included within the scope of our invention and, accordingly, in employing them as dyes, the method of application will vary depending on whether a water-soluble or water-insoluble compound is involved. The water-insoluble dyes will ordinarily be applied to the material in the form of an aqueous suspension which can be prepared by grinding the dye to a paste in the presence of soap or other suitable dispersing agent and dispersing the resulting paste in water.

The water-soluble compounds of our invention do not require a solubilizing or dispersion treatment and may be added directly to an aqueous neutral dye bath and applied directly therefrom to the material undergoing coloration. If desired, common salt may be added to promote exhaustion of the dyebath.

Dyeing operations can be conducted at a temperature of 80–85° C., but any suitable temperature may be employed. In accordance with the usual dyeing practice, the material to be dyed will ordinarily be added to the dyebath at a temperature lower than that at which the main portion of the dyeing is to be effected, a temperature approximating 45–55° C. for example, following which the temperature of the dyebath will be raised to that selected for carrying out the dyeing operation. The temperature at which the dyeing is conducted will vary, depending, for example, on the particular material or materials undergoing coloration.

It will be understood that the anthraquinone compounds may be applied to the material to be colored in any suitable manner. Coloration may be effected, for example, by dyeing, printing or stenciling. Dispersing or solubilizing agents that can be employed for preparing suspensions of the insoluble dye compounds include soap, sulphoricinoleic acid, a salt of sulphoricinoleic acid, and sulfonated oleic, stearic or palmitic acid, or salts thereof, such for instance as the sodium or ammonium salts.

The following example illustrates how dyeing may be carried out in accordance with our invention. Quantities are expressed in parts by weight.

EXAMPLE 12

2.5 parts of

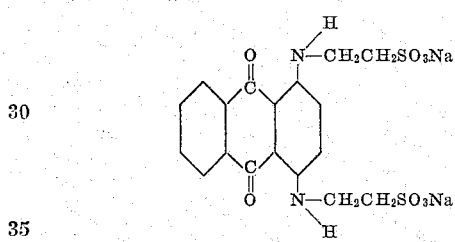

are added to 834 parts of water heated to 45–55° C. and 100 parts of cellulose acetate in the form of threads, fibers or fabric, for example, are entered and the temperature raised to 80–85° C. The cellulose acetate is worked at this temperature until dyeing is complete. The cellulose acetate is dyed a blue shade. By the addition of sodium chloride, the depth of dyeing can be controlled and exhaustion of the dye bath promoted.

Where the water-insoluble free acid form of the compounds of our invention are employed as dyes, they are, as previously noted, first subjected to a dispersing or solubilizing treatment, following which the dyeing operation may be carried out as described above, or in any other suitable manner.

The expression "alkylene sulfonic acid group" appearing in the claims is intended to include the salt as well as the free acid form of the said group.

We claim:

1. As a new product, an anthraquinone compound, containing no sulfonic acid group or carboxylic acid group in the anthraquinone nucleus, having an alkylene sulfonic acid, other than methylene, attached to the anthraquinone nucleus through a nitrogen atom.

2. As a new product, an anthraquinone compound, containing no sulfonic acid group or carboxylic acid group in the anthraquinone nucleus, having an alkylene sulfonic acid, other than methylene, attached to the anthraquinone nucleus through a nitrogen atom which is in an α position on the anthraquinone nucleus.

3. As a new product, an anthraquinone compound, containing no sulfonic acid group or carboxylic acid group in the anthraquinone nucleus, having a β-sulfoethylamino group in an α position on the anthraquinone nucleus.

4. 1,4-diaminoanthraquinones corresponding to the general formula:

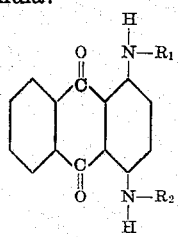

wherein $R_1$ represents an alkylene sulfonic acid group, other than methylene, and $R_2$ represents an alkyl group.

5. 1,4-diaminoanthraquinones corresponding to the general formula:

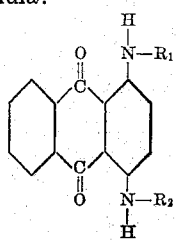

wherein $R_1$ represents a β-sulfoethyl group and $R_2$ represents an alkyl group.

6. 1,4-diaminoanthraquinones corresponding to the general formula:

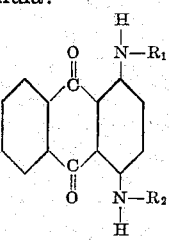

wherein $R_1$ represents an alkylene sulfonic acid group, other than methylene, and $R_2$ represents an aralkyl group.

7. 1,4-diaminoanthraquinones corresponding to the general formula:

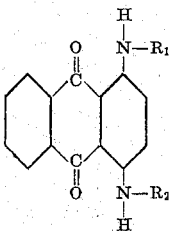

wherein $R_1$ represents an alkylene sulfonic acid group, other than methylene, and $R_2$ represents an aryl group.

8. As a new product, an anthraquinone compound, containing no sulfonic acid group or carboxylic acid group in the anthraquinone nucleus, corresponding to the general formula:

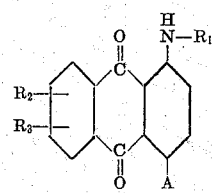

wherein $R_1$ represents an alkylene sulfonic acid group other than methylene, A represents a member selected from the group consisting of a hydroxy group, a halogen atom and a

group, wherein X and Y each represents a member selected from the group consisting of hydrogen, a hydroxy group, an alkyl group, an alkoxy group, an aralkyl group, an aryl radical, a heterocyclic radical, a hydroaromatic radical and an alkylene sulfonic acid group and $R_2$ and $R_3$ each represents a member selected from the group consisting of hydrogen, a hydroxy group, an alkoxy group, an amino group, an alkylamino group, a hydroxyalkylamino group, a heterocyclicamino radical and an arylamino group.

9. As a new product, an anthraquinone compound corresponding to the general formula:

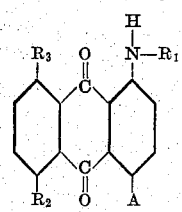

wherein $R_1$ represents an alkylene sulfonic acid group, other than methylene, A represents a member selected from the group consisting of a hydroxy group, a halogen atom and a

group, wherein X and Y each represents a member selected from the group consisting of hydrogen, a hydroxy group, an alkyl group, an alkoxy group, an aralkyl group, an aryl radical, a heterocyclic radical, a hydroaromatic radical and an alkylene sulfonic acid group and $R_2$ and $R_3$ each represents a member selected from the group consisting of hydrogen, a hydroxy group, an alkoxy group, an amino group, an alkylamino group, a hydroxyalkylamino group, a heterocyclicamino radical and an arylamino group.

10. As a new product, an anthraquinone compound corresponding to the general formula:

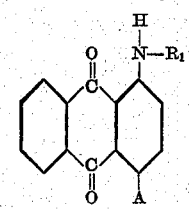

wherein $R_1$ represents an alkylene sulfonic acid group, other than methylene, and A represents a member selected from the group consisting of a hydroxy group, a halogen atom and a

group, wherein X and Y each represents a member selected from the group consisting of hydrogen, a hydroxy group, an alkyl group, an alkoxy group, an aralkyl group, an aryl radical, a heterocyclic radical, a hydroaromatic radical and an alkylene sulfonic acid group.

11. Material containing an organic derivative of cellulose colored with a dye selected from the class of compounds consisting of anthraquinone compounds, containing no sulfonic acid group or carboxylic acid group in the anthraquinone nucleus, having an alkylene sulfonic acid group, other than methylene, attached to the anthraquinone nucleus through a nitrogen atom.

12. Material containing an organic acid ester of cellulose colored with a dye selected from the class of compounds consisting of anthraquinone compounds, containing no sulfonic acid group or carboxylic acid group in the anthraquinone nucleus, having an alkylene sulfonic acid group, other than methylene, attached to the anthraquinone nucleus through a nitrogen atom.

13. A cellulose acetate colored with a dye selected from the class of compounds consisting of anthraquinone compounds, containing no sulfonic acid group or carboxylic acid group in the anthraquinone nucleus, having an alkylene sulfonic acid group, other than methylene, attached to the anthraquinone nucleus through a nitrogen atom.

14. The 1,4-diaminoanthraquinone having the formula:

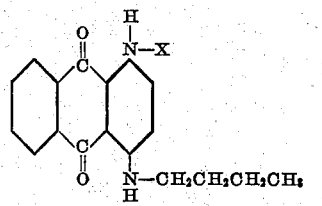

wherein X represents an alkylene sulphonic acid group other than methylene.

15. The 1,4-diaminoanthraquinone having the formula:

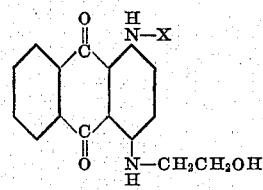

wherein X represents an alkylene sulphonic acid group other than methylene.

16. The 1,4-diaminoanthraquinone having the formula:

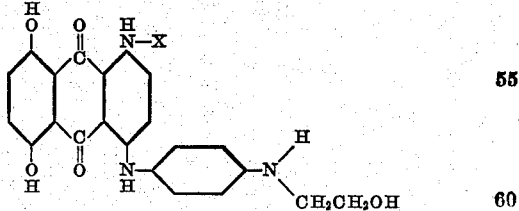

wherein X represents an alkylene sulphonic acid group other than methylene.

17. 1,4-diaminoanthraquinones, containing no sulfonic acid group or carboxylic acid group in the anthraquinone nucleus, having at least one of the amino groups substituted with an alkylene sulfonic acid group other than methylene.

JAMES G. McNALLY.
JOSEPH B. DICKEY.